(12) United States Patent
Matsunaga

(10) Patent No.: US 8,544,323 B2
(45) Date of Patent: Oct. 1, 2013

(54) SENSOR DEVICE

(75) Inventor: Masayuki Matsunaga, Minowa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 13/572,898

(22) Filed: Aug. 13, 2012

(65) Prior Publication Data

US 2012/0304766 A1 Dec. 6, 2012

Related U.S. Application Data

(63) Continuation of application No. 13/427,076, filed on Mar. 22, 2012, which is a continuation of application No. 12/637,792, filed on Dec. 15, 2009, now Pat. No. 8,256,288.

(30) Foreign Application Priority Data

Dec. 16, 2008 (JP) .................................. 2008-320185
Dec. 16, 2008 (JP) .................................. 2008-320186

(51) Int. Cl.
*G01P 1/02* (2006.01)

(52) U.S. Cl.
USPC ......................................... 73/493; 73/504.08

(58) Field of Classification Search
USPC .................... 73/504.08, 498, 504.03, 514.01, 73/514.17
See application file for complete search history.

(56) References Cited

U.S. PATENT DOCUMENTS

| | | | | |
|---|---|---|---|---|
| 3,683,213 A | * | 8/1972 | Staudte ........................ | 310/312 |
| 3,697,766 A | * | 10/1972 | Ganter et al. ................ | 310/348 |
| 4,377,765 A | * | 3/1983 | Kogure et al. ............... | 310/312 |
| 4,379,244 A | * | 4/1983 | Dinger .......................... | 310/312 |
| 5,866,818 A | * | 2/1999 | Sumi et al. .................. | 73/514.33 |
| 6,112,594 A | * | 9/2000 | Brinks et al. .................... | 73/493 |
| 6,236,140 B1 | * | 5/2001 | Arimura ....................... | 310/312 |
| 6,249,074 B1 | * | 6/2001 | Zimnicki et al. ............. | 310/312 |
| 6,262,520 B1 | * | 7/2001 | Knowles ....................... | 310/370 |
| 6,332,359 B1 | | 12/2001 | Ueyanagi et al. | |
| 6,414,569 B1 | * | 7/2002 | Nakafuku ..................... | 333/188 |
| 6,446,507 B2 | | 9/2002 | Ueyanagi et al. | |
| 6,494,092 B2 | | 12/2002 | Ueyanagi et al. | |
| 6,526,827 B2 | | 3/2003 | Ueyanagi et al. | |
| 6,564,634 B2 | | 5/2003 | Ueyanagi et al. | |

(Continued)

FOREIGN PATENT DOCUMENTS

| | | |
|---|---|---|
| JP | 02-310956 | 12/1990 |
| JP | 05-315521 | 11/1993 |

(Continued)

*Primary Examiner* — Peter Macchiarolo
*Assistant Examiner* — Samir M Shah
(74) *Attorney, Agent, or Firm* — Harness, Dickey & Pierce, P.L.C.

(57) ABSTRACT

A sensor device includes: a sensor component including a package, connection terminals including first connection terminals on a terminal forming surface of the package and a sensor element housed in the package; and mounting leads including a one-end part coupled to one first connection terminal so that a main surface thereof faces a main surface of the one first connection terminal face; an intermediate part extending toward a mounting surface of the sensor device from the one-end part; and another-end part. The sensor component is tilted or orthogonal relative to the mounting surface. The connection terminals are provided along one of the sides forming an outline of the terminal forming surface, the one side being tilted or orthogonal with respect to the mounting surface. The intermediate part includes an angled part.

6 Claims, 11 Drawing Sheets

(56) References Cited

U.S. PATENT DOCUMENTS

| | | | |
|---|---|---|---|
| 6,632,697 B2 | 10/2003 | Ueyanagi et al. | |
| 6,701,785 B2 * | 3/2004 | Knowles et al. | 73/504.16 |
| 7,096,733 B2 * | 8/2006 | Ohta et al. | 73/504.16 |
| 7,207,221 B2 * | 4/2007 | Kawauchi et al. | 73/504.12 |
| 7,218,036 B2 | 5/2007 | Shimodaira et al. | |
| 7,290,448 B2 | 11/2007 | Shirasaka et al. | |
| 7,456,554 B2 * | 11/2008 | Ishikawa et al. | 310/367 |
| 7,497,117 B2 * | 3/2009 | Ohta | 73/493 |
| 7,788,978 B2 * | 9/2010 | Ishikawa et al. | 73/504.12 |
| 7,886,596 B2 * | 2/2011 | Matsunaga et al. | 73/504.02 |
| 2002/0021059 A1 * | 2/2002 | Knowles et al. | 310/370 |
| 2005/0264140 A1 | 12/2005 | Miyazaki | |
| 2008/0034865 A1 * | 2/2008 | Matsunaga et al. | 73/510 |

FOREIGN PATENT DOCUMENTS

| | | |
|---|---|---|
| JP | 11-211750 | 8/1999 |
| JP | 11-233709 | 8/1999 |
| JP | 2002-022452 A | 1/2002 |
| JP | 2004-361191 A | 12/2004 |
| JP | 2005-033761 | 2/2005 |
| JP | 2005-318524 A | 11/2005 |
| JP | 2005-341045 A | 12/2005 |
| JP | 2005-341326 A | 12/2005 |
| JP | 2008-051628 | 3/2008 |
| JP | 2008-051629 | 3/2008 |
| JP | 2008-058145 | 3/2008 |
| JP | 2008058145 A * | 3/2008 |
| JP | 2008-096420 | 4/2008 |

* cited by examiner

SENSOR DEVICE

CROSS REFERENCE TO RELATED APPLICATIONS

This is a continuation application of U.S. application Ser. No. 13/427,076 filed Mar. 22, 2012, which is a continuation application of U.S. application Ser. No. 12/637,792 filed Dec. 15, 2009, which claims priority to Japanese Patent Application No. 2008-320185, filed Dec. 16, 2008 and Japanese Patent Application No. 2008-320186, filed Dec. 16, 2008, all of which are expressly incorporated by reference herein.

BACKGROUND

1. Technical Field

The present invention relates to a sensor device, and in particular, a sensor device which is preferable in a case where a detection direction of a detection axis of a sensor element that detects an angular velocity and acceleration is tilted.

2. Related Art

In navigation systems installed in a vehicle such as an automobile, an angular difference may be produced between a mounting surface of a substrate of an electronic apparatus and a detection direction of a detection axis of a sensor element mounted on a sensor device to be mounted on the substrate. In this case, the angular difference has an affect on angular velocities and signals of acceleration, appearing as a decrease in detection sensitivity and a detection error. Conventionally, software corrects such influence of the angular difference. However, a large angular difference between the detection axis and the actual rotation axis or that between the detection axis and a direction to which the acceleration to be added exceeds the correctable range of the software. This makes it difficult to detect the angular velocity and the acceleration.

In view of such a problem, a sensor device has been proposed in which the detection axis corresponds to the detection axis of the angular velocity and the acceleration by changing the mounting angle of the sensor device with respect to the mounting substrate.

JP-A-2008-96420 is a first example of related art. For example, in the first example, the inventor has proposed a sensor device that includes mounting leads formed by being folded so as to maintain a tilted state of a sensor component, into which a sensor element is built, with respect to the mounting substrate, and the sensor component mounted on the mounting leads is covered by a resin. The sensor device having such a configuration allows suppressing the decrease in detection sensitivity and the detection error caused by the angular difference.

JP-A-2008-51629 is a second example of related art. In the second example, a sensor device capable of multi-axis detection is disclosed. The second example shows a technique for changing the detection direction of the detection axis of the sensor element by fixing the side surface of the sensor device, into which the sensor element is built, to a base substrate. With this configuration, it is possible to turn the mounting angle of the sensor device by 90°. As a result, it is possible to detect the angular velocity and the acceleration that cannot be detected by a sensor element mounted parallel to the base substrate.

According to the sensor device disclosed in the first example, the detection axis of the sensor element can be tilted while achieving the mounting stability of the sensor device. Therefore, it is possible to reduce the risk that the detection error between the detection direction of the angular velocity and the acceleration and the actual angle exceeds the correctable range of the software. However, in the sensor device disclosed in the first example, the mounting angle of the sensor element is determined by a bending condition of the mounting leads, so that a variation in the mounting angle of the sensor element may cause a variation in the bending angle of the mounting leads. In addition, when the tilt angle of the sensor element is increased, the mounting leads are exposed to the top of a resin part. This makes it difficult to handle the sensor device in transferring such as chucking.

The technique disclosed in the second example cannot meet particular requirements of the mounting angle since there are only two choices (0° or 90°) for the mounting angle of the sensor element. Further, it is required to design and manufacture a dedicated base substrate for the relocation of wiring, causing an increase of the manufacturing cost.

Further, it is necessary to provide a test-write terminal to the sensor device for testing the sensor element and the like at the time of manufacturing or for writing data into an IC that controls the sensor element. However, in a case where the test-write terminal has the same configuration as that of the mounting terminal, the test-write terminal may be short-circuited by the inadvertent contact with other electrodes, electronic components, and the like.

SUMMARY

An advantage of the present invention is to provide a sensor device which is capable of determining an angle of a mount surface of a sensor element with respect to a mounting surface (a mounting substrate) of the sensor device with high accuracy. The invention further provides a sensor device in which the mounting angle of the sensor element is easily angled to have a predetermined angle, the sensor device in which an arrangement of mounting leads do not become complex, and the sensor device that does not require a dedicated substrate and the like. Furthermore, the invention is to prevent short-circuits of a test-write terminal with other electrodes, electronic components, and the like.

The invention intends to solve at least part of the above problem, and can be realized by the following aspects of the invention.

According to an aspect of the invention, a sensor device includes: a sensor component including a package, connection terminals having first terminals on a terminal forming surface of the package, and a sensor element that has a detection axis and is housed in the package; a resin part covering the sensor component; and mounting leads, each of the mounting leads including, a one-end part formed by being folded so as to be coupled to one of the first connection terminals in the resin part so that a main surface of the one-end part and a main surface of the one of the first connection terminals face each other, an intermediate part extending toward a mounting surface of the sensor device from the one-end part, and an other-end part formed by being folded so as to be externally exposed from the resin part. In the device, the sensor component is tilted or orthogonal with respect to the mounting surface, and the connection terminals are provided along one of the sides forming an outline of the terminal forming surface, the one side being tilted or orthogonal with respect to the mounting surface.

According to the aspect of the invention, since it is possible to reduce the influence on an angle θ formed by the mounting substrate and a sensor element mounting surface (the terminal forming surface) due to a variation in the bending angle of the mounting leads, the angle θ can be defined with high accuracy. Even if the angle is increased, the arrangement of the mounting leads does not become complex. Further, the base substrate and the like for mounting the sensor element are unnecessary by the use of the mounting leads.

In the sensor device, the terminal forming surface of the sensor component may be orthogonal to the mounting surface of the sensor device, and the connection terminals may be provided along the one side of the outline of the terminal forming surface, the one side being orthogonal to the mounting surface.

With this configuration, since it is possible to eliminate the influence on the angle θ formed by the mounting substrate and the sensor element mounting surface (the terminal forming surface) due to the variation in the bending angle of the mounting lead, the angle θ can be defined with high accuracy. Further, the routing of the leading lead does not become complex.

In the sensor device, the intermediate part may include an angled part.

With this configuration, the tilt (the angle θ) of the sensor device is determined by a planar shape of the intermediate part of the mounting lead. As a result, the angle θ can be defined with high accuracy compared to related art configuration in which the angle θ is determined by the bending angle of the mounting lead.

In the sensor device, a planar shape of the intermediate part may be an arch shape.

With this structure, the angle θ is determined by determining a length of the intermediate part of the mounting lead.

In the sensor device, the other-end parts of the mounting leads may be bent to a side of one main surface and a side of the other main surface of the mounting lead.

This configuration allows increasing an area of the mounting surface. As a result, it is possible to improve the stability when the sensor device is placed to the mounting substrate and the like.

In the sensor device, the other-end parts of the mounting leads adjacent to each other are alternately bent toward the one main surface and the other main surface of the mounting lead.

This configuration allows increasing a position of the other-end part of the mounting lead, i.e., a space between the mounting terminals of the sensor device, thereby preventing short-circuits between the mounting terminals.

The sensor device may further include test-write leads. In the device, the connection terminals may include second connection terminal. Each of the test-write leads may includes: an one-end part coupled to one of the second connection terminal so that a main surface of the one-end part and a main surface of the second connection terminal face each other; an intermediate part that is laid out on the terminal forming surface and externally extended from the resin part so as to straddle a side adjacent to the one side of the terminal forming surface; and a other-end part outwardly exposed from the resin part.

This configuration allows preventing short circuits of a test-write terminal with other electrodes, electronic components, and the like.

BRIEF DESCRIPTION OF THE DRAWINGS

The invention will be described with reference to the accompanying drawings, wherein like numbers reference like elements.

FIG. 11A is a case where an angle θ formed by the terminal forming surface and a mounting surface is 0° and FIG. 11B shows a case where the angle θ is 90°.

DESCRIPTION OF EXEMPLARY EMBODIMENTS

First Embodiment

Figure 1A:
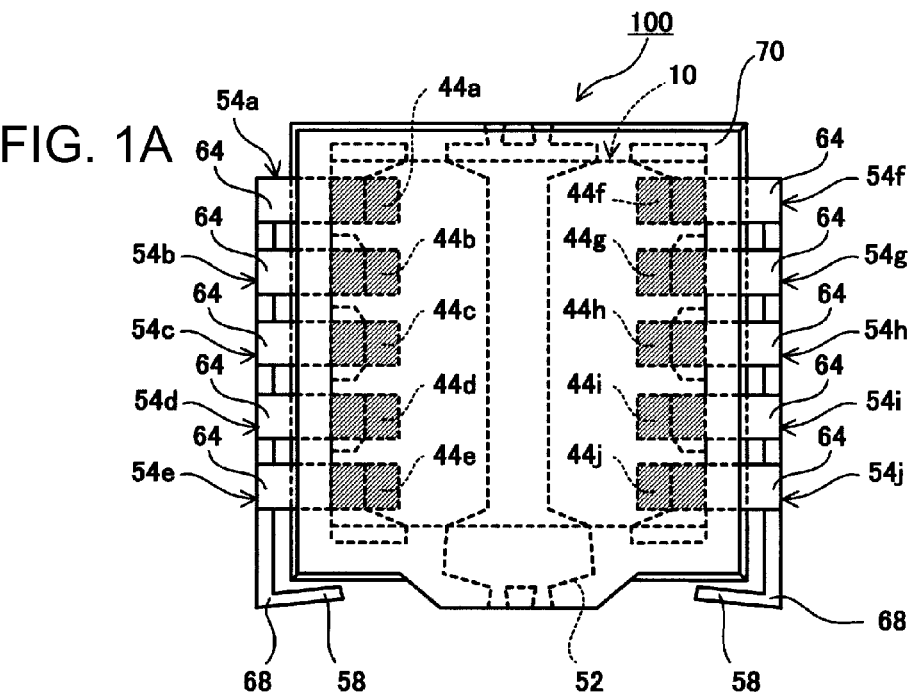
FIG. 1A is a front view and FIG. 1B is a back view of a sensor device according to a first embodiment of the invention.
Figure 1B:
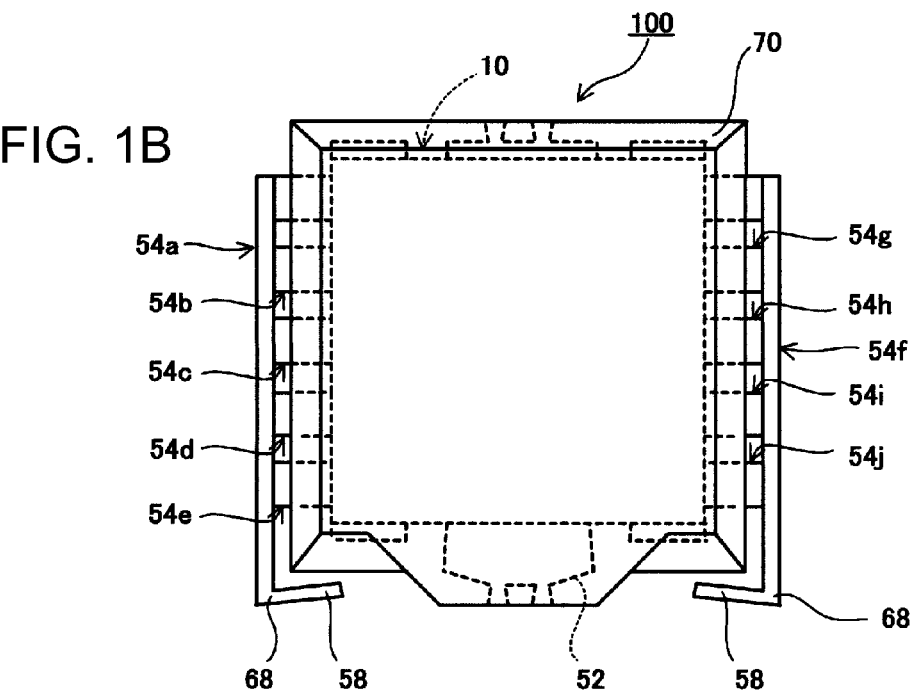
Figure 2A:
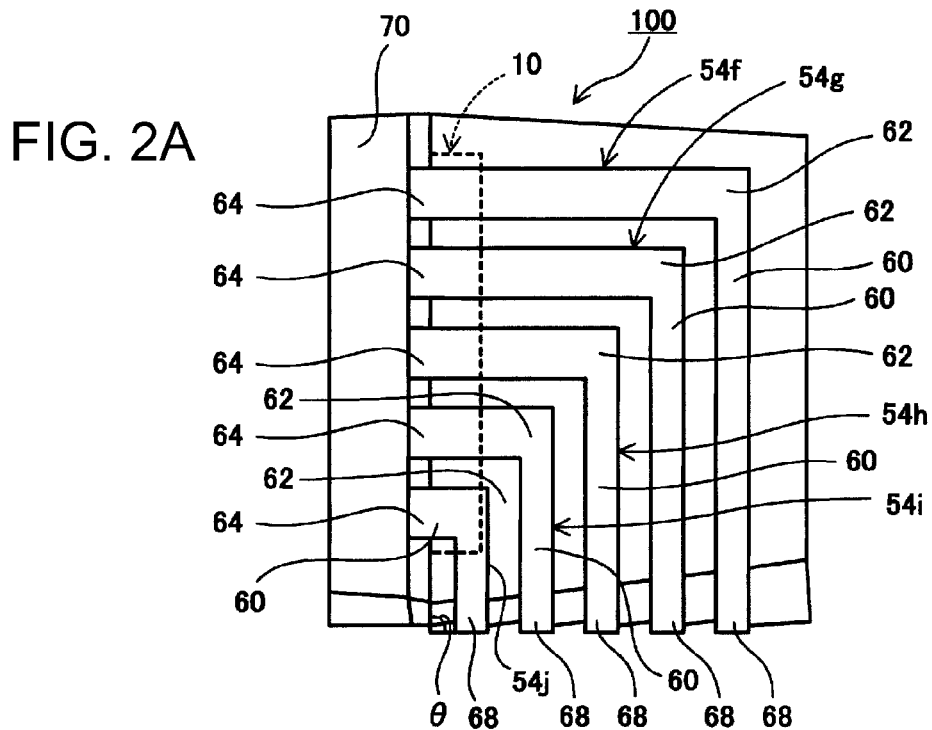
FIG. 2A is a right side view and FIG. 2B is a bottom view of the sensor device according to the first embodiment.
Figure 2B:
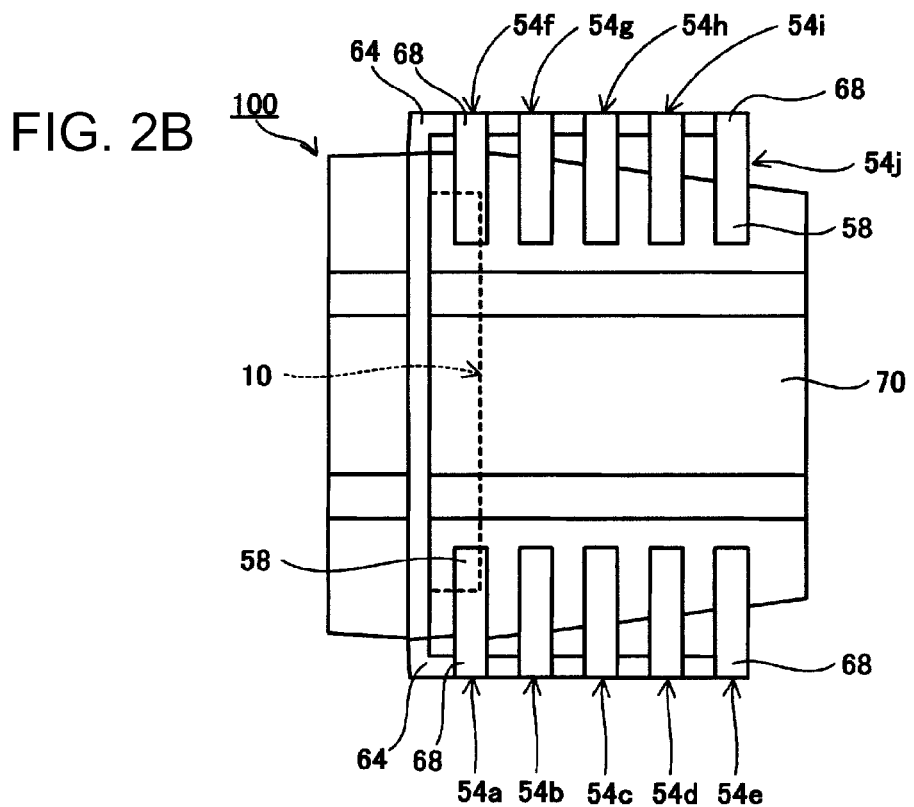

Hereinafter, a sensor device according to the invention will now be described in detail with reference to accompanying drawings. In the embodiments below, though a gyro sensor device will be described as an example of the sensor device of the invention, the sensor device is not limited to this. FIG. 1A is a front view and FIG. 1B is a back view of the sensor device. FIG. 2A is a right side view and FIG. 2B is a bottom view of the sensor device.

A sensor device 100 according to the present embodiment mainly includes a gyro sensor 10 serving as a sensor component, mounting leads 54 (54a to 54j), and a resin part 70.

Figure 3A:
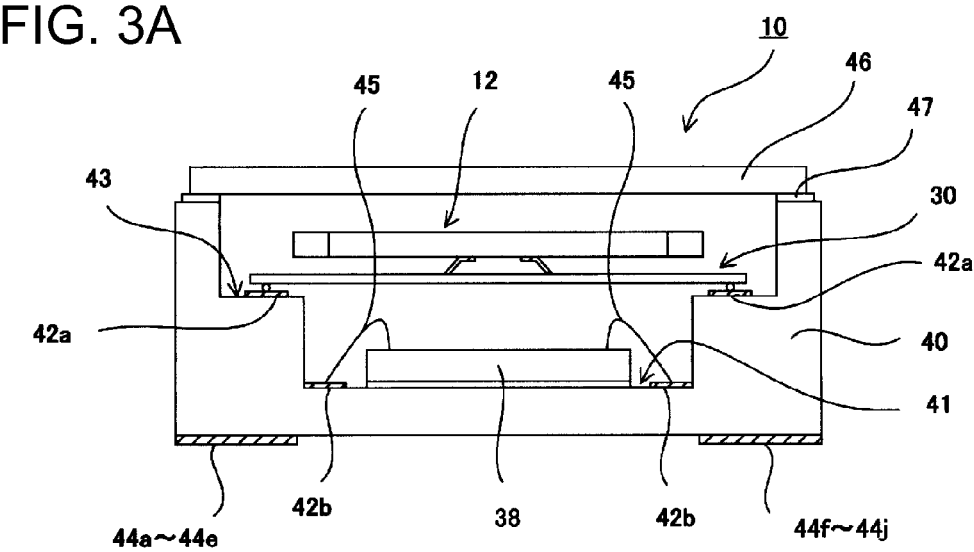
FIG. 3A is a sectional view and FIG. 3B is a bottom view of a gyro sensor adopted in the first embodiment.
Figure 3B:
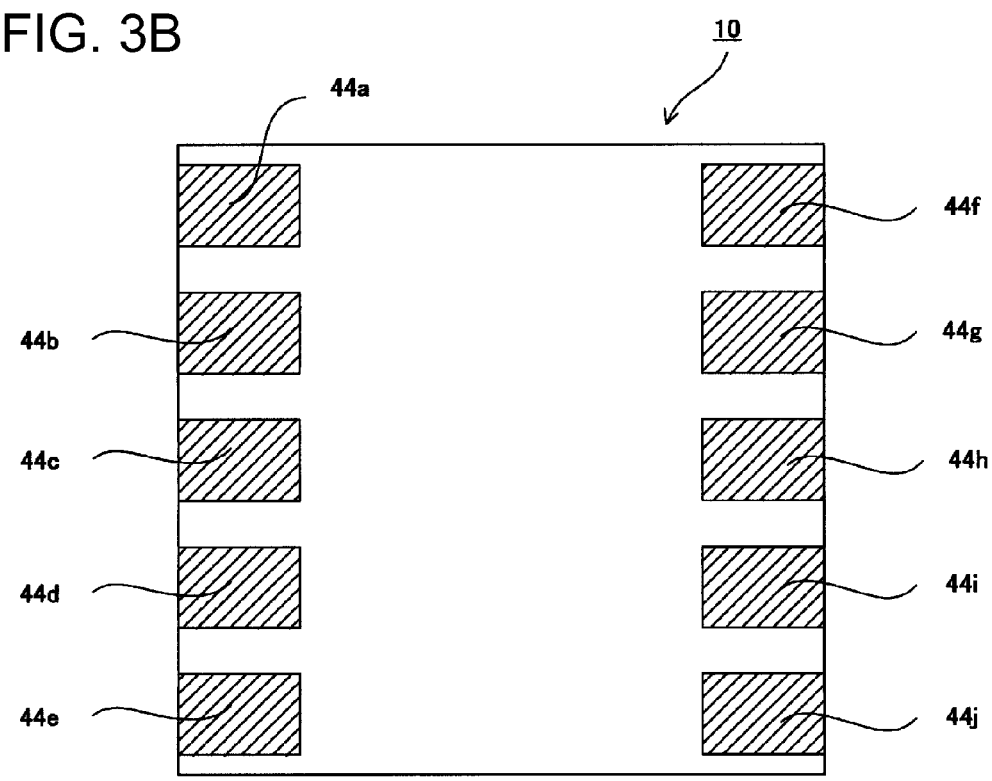
Figure 4:
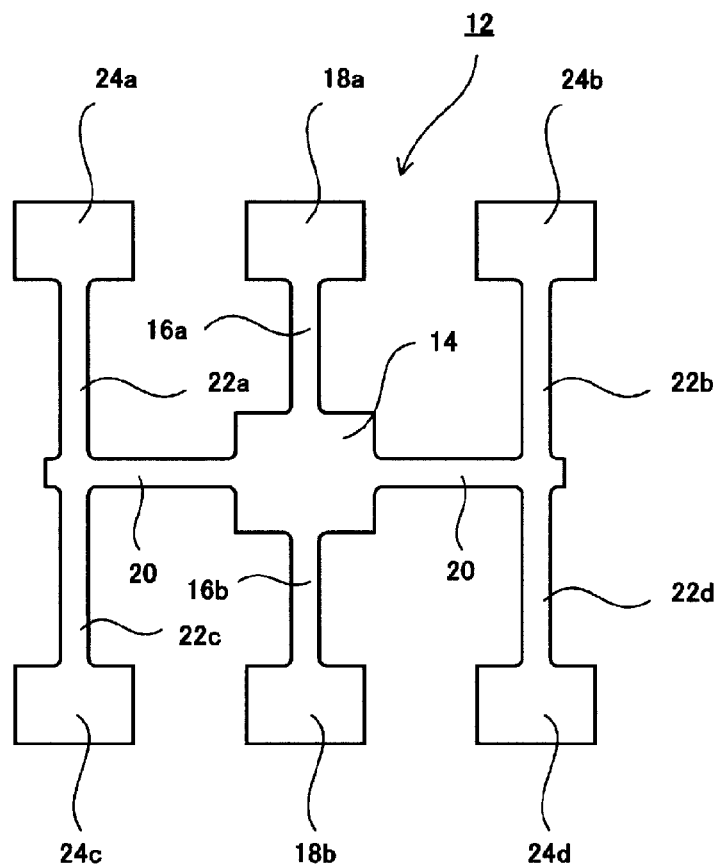
FIG. 4 is a diagram showing a configuration of a quartz crystal resonator element adopted in the first embodiment.

As shown in FIG. 3A, the gyro sensor 10 mainly includes a crystal quartz resonator element 12, a support substrate 30, an IC 38, a package 40, and a lid 46. FIG. 3A is a sectional view and FIG. 3B is a bottom view of the gyro sensor. The crystal quartz resonator element 12 serves as a sensor element for detecting an angular velocity. The configuration of the crystal quartz resonator element 12 according to the embodiment is specifically shown in FIG. 4.

The crystal quartz resonator element 12 includes a base part 14, a pair of detection arms 16a and 16b extended from the base part 14, connection parts 20 extended in a direction orthogonal to the detection arms 16a and 16b from the base part 14, two pairs of driving arms 22a to 22d extended from the end of each of the connection parts 20 so as to be parallel to the detection arms 16a and 16b. In the crystal quartz resonator element 12 shown in FIG. 4, weighted parts 18a, 18b, and 24a to 24d are respectively provided to the end of each of the detection arms 16a and 16b as well as the end of each of the driving arms 22a to 22d. A detection electrode (not shown) and a driving electrode (not shown), which serve as an excitation electrode, are respectively formed on the detection arms 16a and 16b as well as the driving arms 22a to 22d, and the electrodes are coupled to an input-output electrode (now shown) formed on the base part 14. Here, the detection arms 16a and 16b and the driving arms 22a to 22d may have a so-called an H-shaped section. In this way, the flexibility of the arms is improved, increasing the detection sensitivity.

Figure 5:
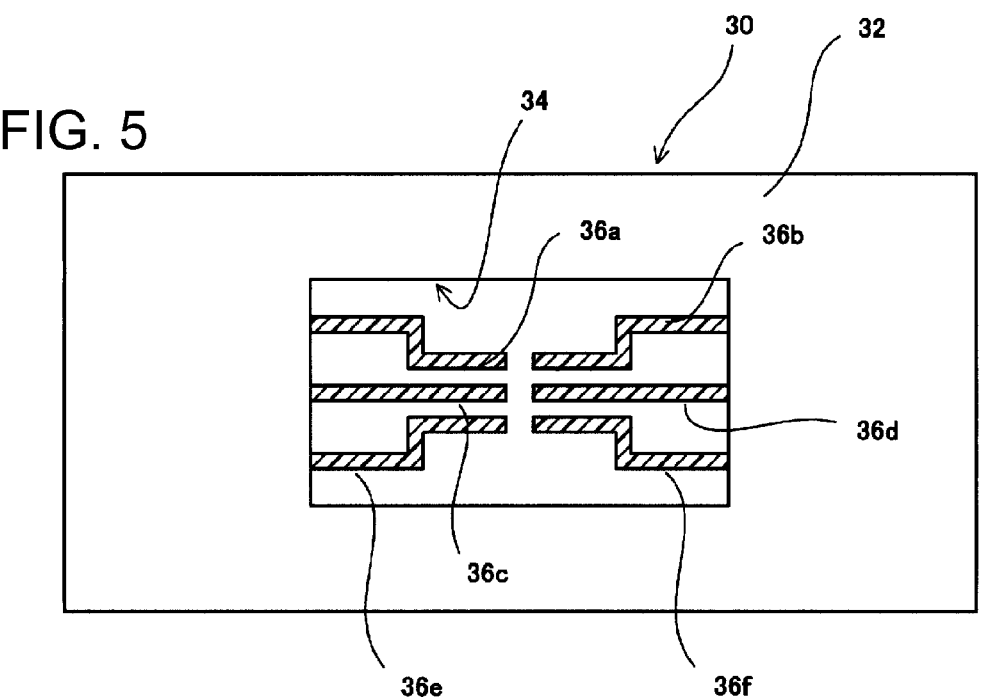
FIG. 5 is a diagram showing a configuration of a support substrate adopted in the first embodiment.

The support substrate 30 supports the crystal quartz resonator element 12 in a state of being suspended from a bottom surface 41 of the package 40 described in detail below or a step part 43. As shown in FIG. 5, the support substrate 30 is a TAB substrate that includes wires 36 (36a to 36f) and a resin film 32 for covering the wires 36. The wires 36 are a conductive wire having flexibility. Provided to the resin film 32 around the center of the support substrate 30 is an opening 34, so that the wires 36 are exposed. The wires 36 located at the opening 34 are curved so as to be lifted up in a side, to which the crystal quartz resonator element 12 is provided, with respect to the main surface of the support substrate 30 so that the crystal quartz resonator element 12 is supported in a state of being suspended. Here, the end (one end) of each of the offset wires 36 serves as a connection terminal coupled to an input-output terminal of the crystal quartz resonator element 12. Further, the other end of the wire 36 serves as a connection terminal coupled to an internal connection terminal 42a provided to the step part 43 of the package 40.

The IC 38 is an integrated circuit for controlling the driving arms 22a to 22d while detecting signals obtained by the detection arms 16a and 16b. The IC 38 is mounted on the bottom surface 41 of the package with an adhesive or the like. A connection pad (not shown) formed on the active surface is electrically coupled to an internal connection terminal 42b provided on the bottom surface 41 of the package 40 via a metal wire 45.

The package 40 is a box for housing the crystal quartz resonator element 12, the support substrate 30, and the IC 38 described above. A step-like recess is formed inside the package 40. It is preferable that the package 40 is formed of ceramics or that like that have an insulation property.

The internal connection terminals 42a and 42b are provided to the bottom surface 41 and the step part 43 of the package 40 so as to mount the above-described support substrate 30 and the IC 38. To the external bottom surface (back side) of the package 40, connection terminals 44a to 44j are provided that are respectively electrically coupled to mounting leads 54a to 54j described below. Here, the internal connection terminals 42a and 42b are electrically coupled to the connection terminals 44a to 44j via a through hole or the like (not shown).

The lid 46 seals the opening of the package 40. The lid 46 generally is a flat plate of metal (an alloy, e.g., kovar) that has a close linear expansion coefficient with the package 40, or a flat plate of glass (e.g., soda glass). In a case where the lid 46 is formed of metal, the package 40 is bonded to the lid 46 with low-melting-point metal as a coupling member 47. On the other hand, in a case where the lid 46 is made of glass, low-melting-point glass is used as the coupling member 47.

The above-described gyro sensor 10 includes the IC 38 mounted on the bottom surface 41 of the package 40, and the IC 38 and the internal connection terminal 42b are wire-bonded. The crystal quartz resonator element 12 is mounted on the support substrate 30, and the support substrate 30 is mounted on the step part 43 of the package 40. The support substrate 30 is mounted to the package 40 with a conductive adhesive or a bump. After mounting the support substrate 30, the lid 46 is bonded to the opening of the package 40. The bonding of the lid 46 is carried out in a vacuum atmosphere, so that the inner space of the package 40 is evacuated to vacuum. In this way, the crystal quartz resonator element 12 is not hindered from being excited.

Figure 6:
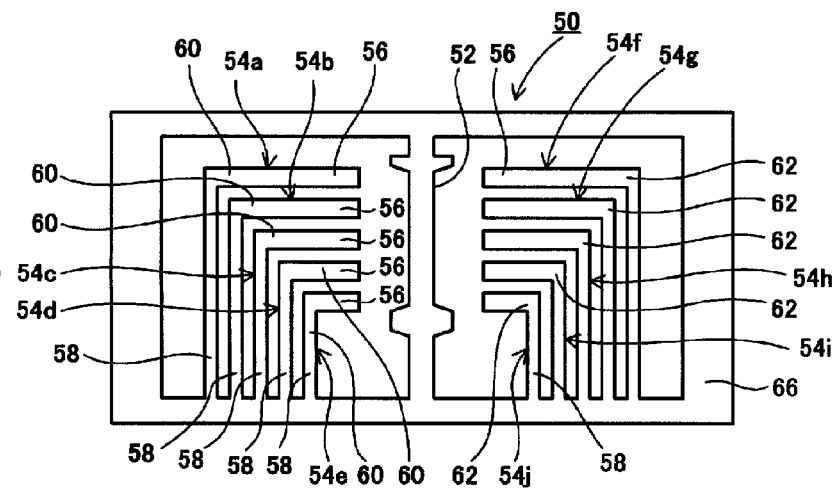
FIG. 6 is a diagram showing a configuration of a lead frame unit adopted in the sensor device according to the first embodiment of the invention.
Figure 11A:
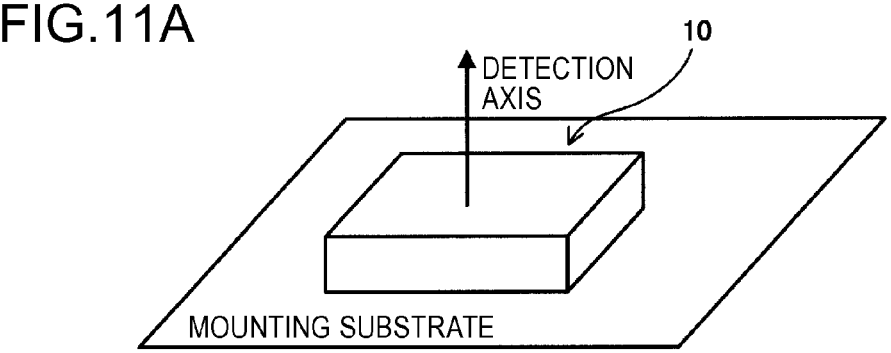
FIGS. 11A and 11B show a mounting state of the gyro sensor and a state of a tilt of a detection axis.
Figure 11B:
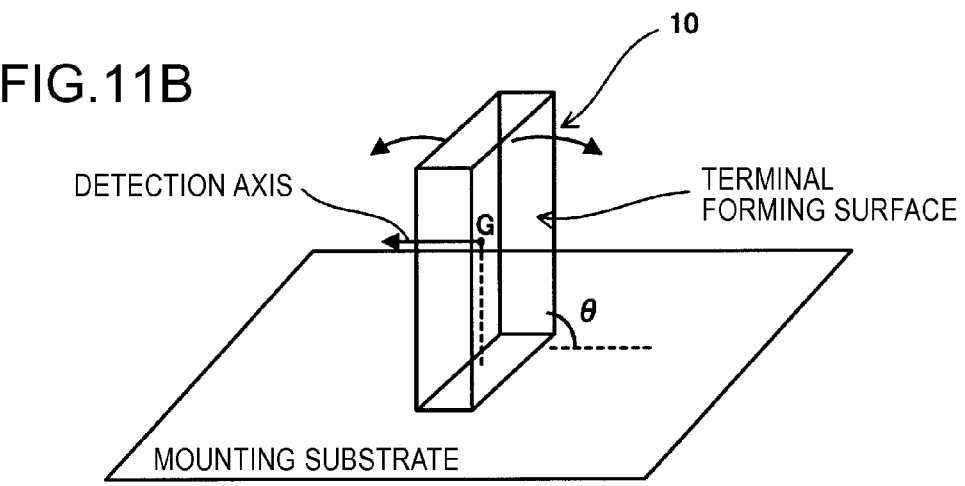

The mounting leads 54a to 54j set and maintain an angle θ formed by a mounting surface (a surface that includes a part where the mounting leads 54a to 54j come into contact with the top surface of the mounting substrate) and a terminal forming surface of the gyro sensor 10 (refer to FIGS. 11A and 11B: FIG. 11A shows a case where the angle θ is 0° and FIG. 11B shows a case where the angle θ is 90°). The mounting leads 54a to 54j also electrically couple the gyro sensor 10 with the mounting surface. The mounting leads 54a to 54j according to the embodiment are formed by bonding the gyro sensor 10 to a lead frame unit shown in FIG. 6, forming, cutting, and curving a resin part 70 described in detail below. In a case where the angle θ is larger, the position of a gravity center G is higher, so that the mounting state becomes unstable. However, by mounting the gyro sensor 10 with the mounting leads 54a to 54j, the mounting area can be increased, and the stability of the mounting state can be achieved.

The lead frame unit 50 includes the mounting leads 54a to 54j, a die pad 52, and a frame 66. Each of the mounting leads 54a to 54j includes a one-end part 56, an other-end part 58, and an intermediate part 60. The one-end part 56 is a connection part coupled to one of the connection terminals 44a to 44j of the gyro sensor 10. The other-end part 58 serves as a mounting terminal of a gyro sensor device 100. The intermediate part 60 is located between the one-end part 56 and the other-end part 58. The intermediate part 60 determines the angle θ for mounting the gyro sensor 10. In the embodiment, an angled part 62 is formed such that an extending direction of the one-end part 56 and that of the other-end part 58 makes 90°. In the lead frame unit 50 according to the embodiment, the end side of the other-end part 58 is coupled to the frame 66, and the mounting leads 54a to 54j are integrally formed with the frame 66.

The die pad 52 serves as a base when the one-end parts 56 are respectively electrically coupled to the connection terminals 44a to 44j of the gyro sensor 10. The die pad 52 is a metal plate provided so as to connect the upper side and the lower side of the frame 66.

The frame 66 is a frame member provided to the periphery of the mounting leads 54a to 54j and the die pad 52, and tying the mounting leads 54a to 54j and the die pad 52 together as an integral unit. The frame 66 and the mounting leads 54a to 54j as well as the frame 66 and the die pad 52 are cut off after the formation of the resin part 70, and respectively serve as an independent component.

The die pad 52 and the mounting leads 54a to 54j are bonded to the gyro sensor 10 with an adhesive. The die pad 52 and the like may be bonded to the gyro sensor 10 with a conductive adhesive. Between the one-end part 56 and each of the connection terminals 44a to 44j are electrically coupled with a metal wire 69 formed by a wire bonding method so that a main surface of the one-end part and a main surface of the connection terminal face each other. Here, between the one-end part 56 and each of the connection terminals 44a to 44j may be electrically and mechanically coupled with a conductive connection member such as solder and a conductive adhesive.

The resin part 70 covers the die pad 52 and the gyro sensor 10 bonded to the mounting leads 54a to 54j so as to ensure the airtight property and protect the connection part. The resin part 70 is formed of a thermoplastic resin. The mounting leads 54a to 54j outwardly protrude from the resin part 70.

The gyro sensor device 100 according to the embodiment includes first and second bent parts 64 and 68 in each of the mounting leads 54a to 54j outwardly protruded from the resin part 70. The first bent part 64 is provided between the one-end part 56 and the intermediate part 60. The second bent part 68 is provided between the other-end part 58 and the intermediate part 60. Both of the first and second bent parts 64 and 68 are bent along the resin part 70. The tilt of the gyro sensor 10 in the gyro sensor device 100 is determined by a planar shape of the intermediate part 60. Thus, the tile of the gyro sensor 10 is hardly influenced by the bending angles of the first and second bent parts 64 and 68. In the embodiment, the first and second bent parts 64 and 68 both have a bending angle of approximately 90°.

According to the gyro sensor device 100 having such a configuration, even if the angle θ formed by the terminal forming surface (a first surface) of the gyro sensor 10 and the mounting surface (a second surface) of the gyro sensor device 100 is 90°, the arrangement of the mounting leads 54a to 54j, i.e., the bending angle does not become complex.

In addition, in the gyro sensor device 100, one main surface and the other main surface of the connection part, which is the one-end part 56 of each of the mounting leads 54a to 54j, are provided substantially perpendicular to the mounting surface of the gyro sensor device 100, and each first bend part 64 is formed by being folded at a line substantially perpendicular to the mounting surface. Accordingly, even if a variation is produced in the bending angle of the first bent part 64, the lowermost end of the mounting terminal, which is the other-end part 58, in other wards a part of the mounting terminal that comes into contact with a mounting pattern of the mounting substrate, moves within a surface parallel to the top surface of the mounting substrate. Accordingly, since it is possible to eliminate the influence on the angle θ due to the variation in the bending angle at the bend part 64 of each mounting lead, the angle θ can be defined with high accuracy.

The first and second surfaces are provided so as to have a predetermined angle by determining a shape of the intermediate part, so that it can be achieved without the dedicated base substrate. As a matter of course, the dedicated base substrate and the like that are tailored for fixing the gyro sensor 10 at the side surface are unnecessary, allowing the manufacturing cost to be reduced.

Figure 7:
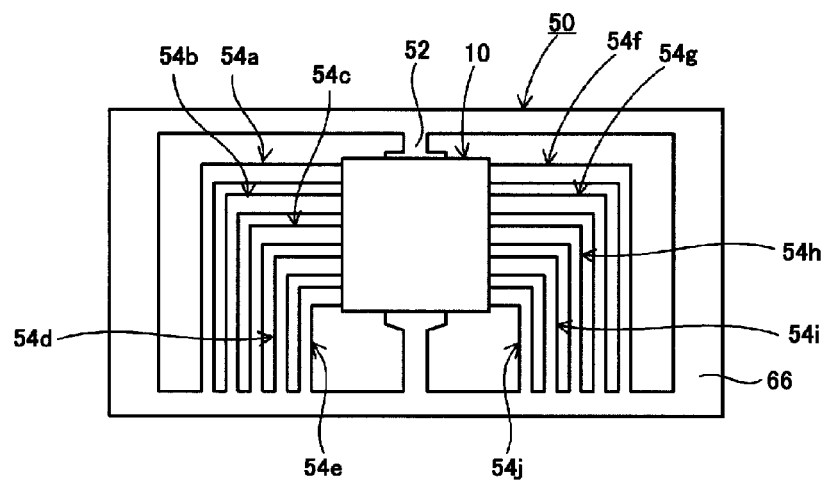
FIG. 7 is a diagram showing a state in which the gyro sensor is bonded to the lead frame unit.

A process for manufacturing the gyro sensor 100 will be described. An adhesive (now shown) is applied to the die pad 52 of the lead frame unit 50 or the die pad 52 and each one-end part 56 shown in FIG. 6. The gyro sensor is bonded to the lead frame unit 50 while the terminal forming surface faces the lead frame unit 50 to which the adhesive is applied (refer to FIG. 7). At this time, each one-end part 56 of the mounting leads 54a to 54j is provided such that a main surface thereof comes into contact with and faces a main surface of the corresponding connection terminals 44a to 44j. As a result, it is possible to stably mount the gyro sensor 10 on the lead frame unit 50.

Figure 8:
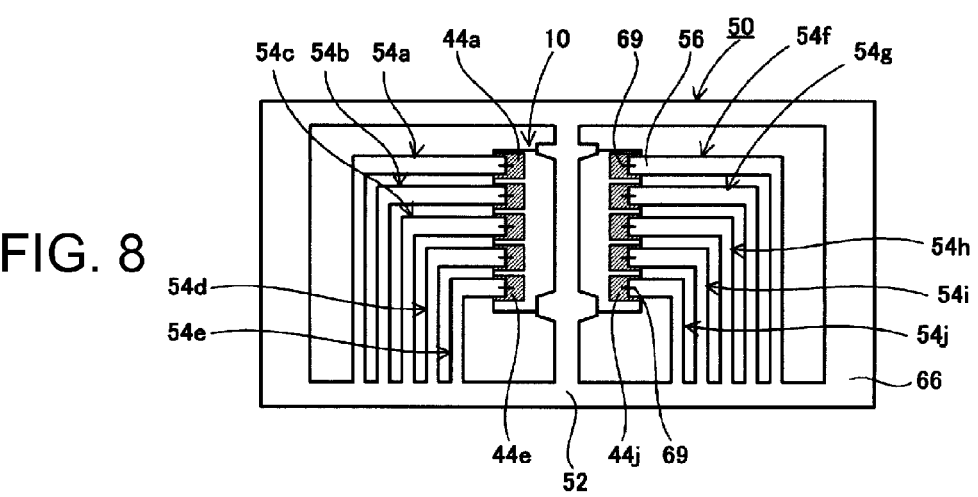
FIG. 8 is a diagram showing the lead frame unit, to which the gyro sensor is bonded, from a side of a terminal forming surface.

The connection terminals 44a to 44j of the gyro sensor 10 whose terminal forming surface is bonded to the lead frame unit 50 are respectively coupled to the one-end part 56 of the mounting leads 54a to 54j with the metal wire 69, achieving electrical connection between the connection terminals 44a to 44j and the mounting leads 54a to 54j (refer to FIG. 8).

Figure 9:
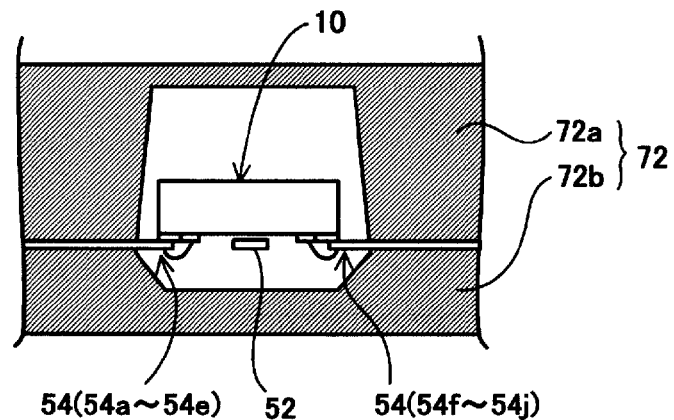
FIG. 9 is a diagram showing a state in which the gyro sensor bonded to the lead frame unit is put into a die for forming a resin part.

The gyro sensor 10 bonded to the mounting leads 54a to 54j as above is built into a die 72 used for a molding process. The die 72 includes an upper die 72a and a lower die 72b. A resin, which is heated to be melted (not shown), is pressed-fit into the die 72 into which the gyro sensor 10 is built, so that the outer shape of the resin part 70 is formed (refer to FIG. 9).

Figure 10:
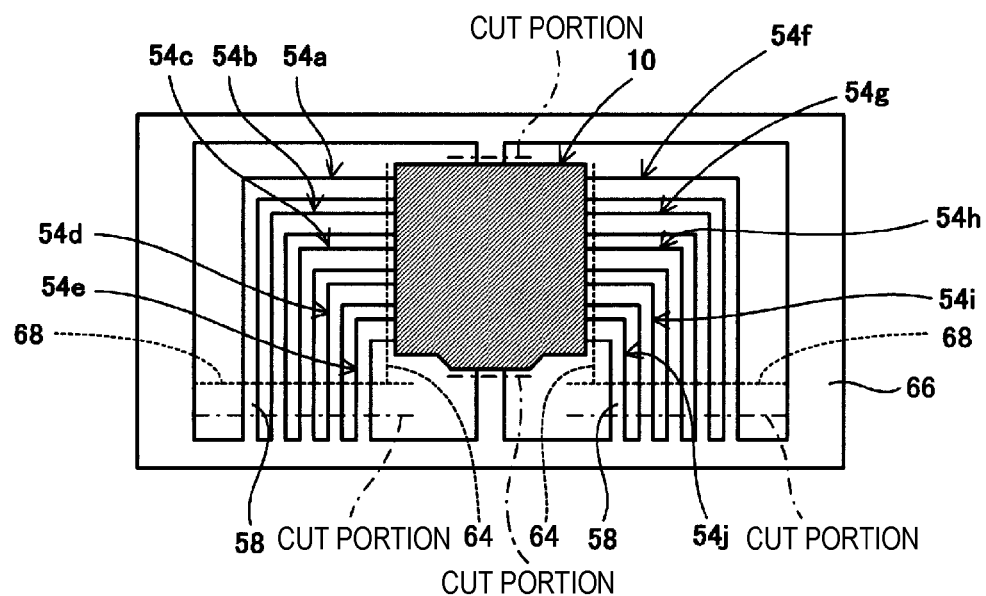
FIG. 10 is a diagram showing a state of the sensor device after the resin part is formed and before cutting a frame.

After the resin pressed-fit into the die 72 is hardened, the gyro sensor 10 covered by the resin part 70 is taken out. In the gyro sensor 10 taken out from the die 72, the mounting leads 54a to 54j and the die pad 52 are cut off from the frame 66 at the point indicated by the dashed lines in FIG. 10. Accordingly, the mounting leads 54a to 54j and the die pad 52 respectively serve as an independent component.

Each of the mounting leads 54a to 54j, which is cut off, is folded to the bonding surface side of the gyro sensor 10 (e.g., the one main surface side) along the resin part 70, forming the first bent part 64. Each of the mounting leads 54a to 54j, which is in a state of protruding the other-end part 58 to the lower surface side of the resin part 70 by the formation of the first bent part 64, is folded to the lower surface side of the resin part 70, forming the second bent part 68.

First Modification

Figure 12:
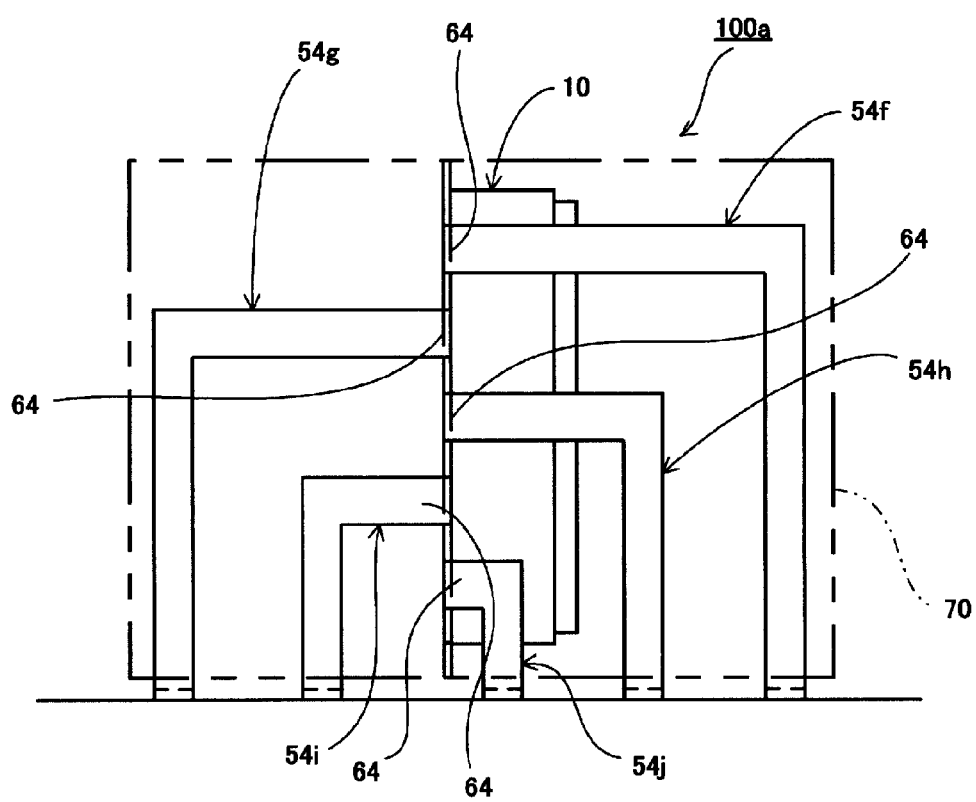
FIG. 12 is a diagram showing a first modification of the sensor device according to the first embodiment.

A first modification of the sensor device according to the first embodiment will be described with reference to FIG. 12. In a gyro sensor device 100a according to the present modification, the first bent part 64 of the mounting leads 54a to 54j protruded from the resin part 70 is bent differently from that of the above-described first embodiment.

In other wards, in the gyro sensor device 100 according to the first embodiment, each first bent part 64 is folded to the direction along the resin part 70 (the one main surface side of the mounting leads 54a to 54j). On the other hand, in the gyro sensor device 100a according to the modification, the first bent parts 64 of the mounting leads 54 adjacent to each other is alternatively folded to the one main surface side and the other main surface side. This allows increasing a space between the mounting terminals (the other-end parts 58 of the mounting leads) adjacent to each other, thereby reducing the risk of short-circuit and the like when the sensor device is mounted on the mounting substrate. Further, the large area of the mounting surface can be ensured, improving the mounting stability. Furthermore, the gyro sensor 10 is located around the center of the gyro sensor device 100a, increasing the stability in the placed state.

Here, other configurations, functions, effects, and the like are the same as those of the gyro sensor device 100 according to the first embodiment.

Second Embodiment

Figure 13:
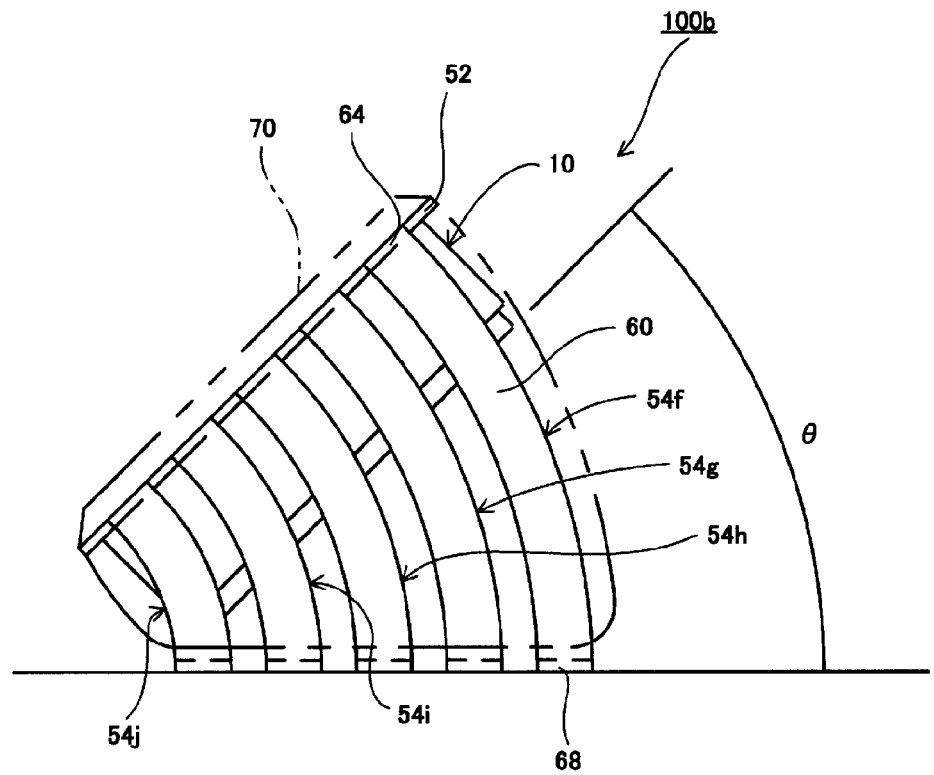
FIG. 13 is a diagram showing a configuration of the sensor device according to a second embodiment.

A second embodiment of the sensor device according to the invention will be described with reference to FIG. 13. The configuration of the sensor device according to the present embodiment is mostly the same as that of the sensor device according to the first embodiment described above. Thus, the same reference numerals are given to portions having the same functions as those in the first embodiment and thus descriptions thereof will be omitted.

A gyro sensor device 100b serving as a sensor device according to the embodiment and the gyro sensor device 100 serving as a sensor device according to the first embodiment differ in the configuration of each intermediate part of the mounting lead 54*a* to 54*j* and the configuration of the resin part 70.

To be specific, in order to set the angle θ, the gyro sensor device 100 according to the first embodiment includes the angled part 62 provided at each intermediate part of the mounting leads 54*a* to 54*j*. On the other hand, in a gyro sensor device 100*b* according to the embodiment, the angled part 62 is not provided. Instead, the gyro sensor device 100*b* includes the intermediate part 60 having an arc shape in a planer view so as to ensure the angle θ.

In a case where the mounting leads 54*a* to 54*j* have such a configuration, the angle θ can be freely changed by a length of the intermediate part 60, i.e., a position of the second bent part 68. Accordingly, design change and the like of the lead frame unit due to the configuration of the angle θ are not necessary, allowing the manufacturing cost to be reduced. In addition, the same lead frame unit can be used in various configurations, making the stock control easier.

Here, other configurations, functions, effects, and the like are the same as those of the gyro sensor device 100 according to the first embodiment.

Second Modification

Figure 14:
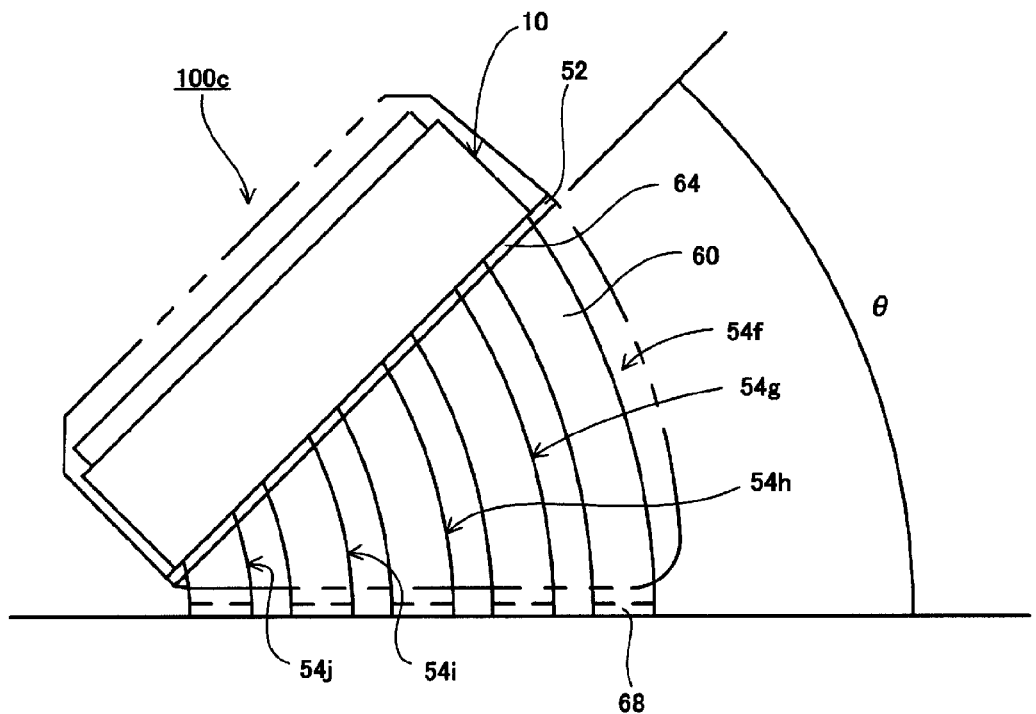
FIG. 14 is a diagram showing a second modification of the sensor device according to the second embodiment.

A second modification of the sensor device according to the second embodiment will be described with reference to FIG. 14. In a gyro sensor device 100*c* according to the present modification, each first bent part 64 of the mounting leads 54*a* to 54*j* is bent in an opposite surface side (the other surface side) from the bonding surface (the one surface) of the gyro sensor 10. Even with this configuration, the same effects as the gyro sensor device 100*b* according to the second embodiment can be obtained.

Third Embodiment

A third embodiment of the sensor device according to the invention will be described with reference to FIGS. 15A and 15B.

Figure 15A:
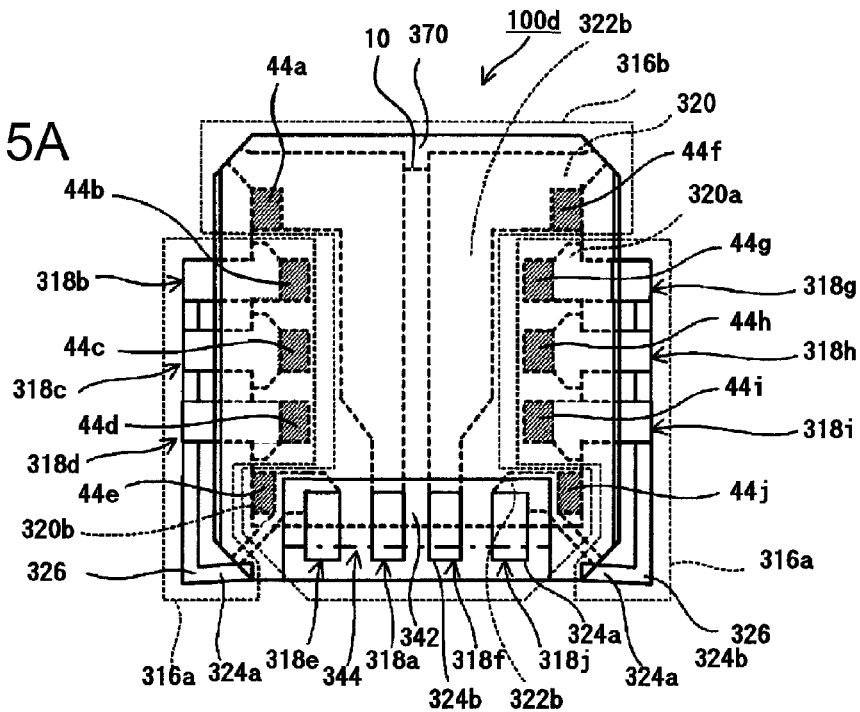
FIG. 15A is a front view and FIG. 15B is a back view of the sensor device according to a third embodiment.
Figure 15B:
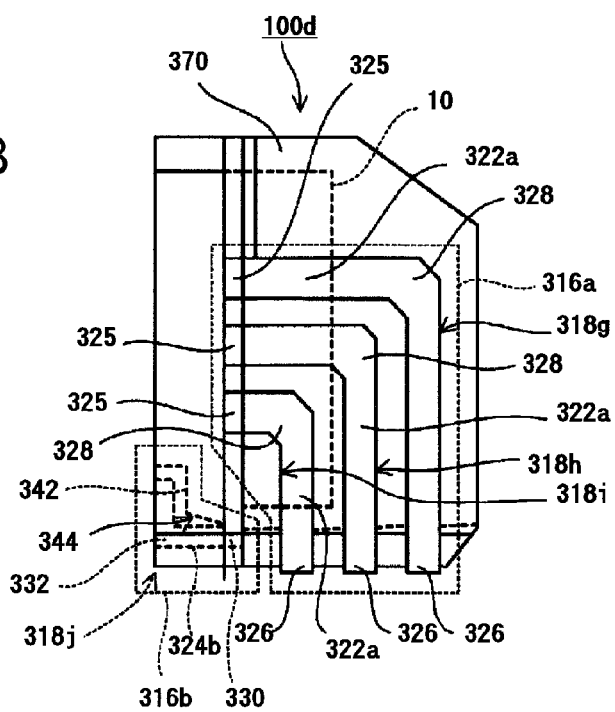

FIG. 15A is a front view and FIG. 15B is a right side view of the sensor device.

A sensor device 100*d* according to the present embodiment includes the gyro sensor 10, a plurality of leads 318*a* to 318*j*, and a resin part 370. The gyro sensor 10 includes the connection terminals 44*a* to 44*j* on the terminal forming surface of the outer surface thereof. Each surface of the gyro sensor 10 has a rectangular shape, and the connection terminals 44*a* to 44*j* are formed along a pair of the sides facing each other in the terminal forming surface. An angular velocity detection element that forms the gyro sensor, an IC for controlling input-output signals, and the like (all not shown) are mounted inside the package of the gyro sensor 10.

The plurality of leads 318*a* to 318*j* includes a first lead group 316*a* and a second lead group 316*b*. The leads 318*b* to 318*d* and 318*g* to 318*i*, which belong to the first lead group 316*a*, are formed by folding a conductive flat plate having a one-end part 320*a* and a other-end part 324*a*. Each of the one-end parts 320*a* is electrically coupled to one of the connection terminals 44*b* to 44*d* and 44*g* to 44*i* of the gyro sensor 10. The other-end part 324*a* serves as a mounting terminal of the sensor device. An intermediate part 322*a* is provided between each one-end part 320*a* and each other-end part 324*a*. The intermediate part 322*a* in the sensor device 100*d* according to the embodiment changes the extending direction of the leads that belong to the first lead group 316*a*, and an angled part 328 is provided to the intermediate part 322*a*. The angled part 328 changes the extending direction of the flat plate extending toward the other-end part 324*a* from the one-end part 320*a*.

The first lead group 316*a* is provided so as to extend toward the outside of the package component from the pair of sides in the terminal forming surface while the one-end parts 320 are respectively coupled to the connection terminals 44*b* to 44*d* and 44*g* to 44*i*. The leads 318*b* to 318*d* and 318*g* to 318*i*, which are extended, are exposed from the resin part 370 described in detail below. First and second bent parts 325 and 326 are provided to each part exposed from the resin part 370. The first bent part 325 is located between the one-end part 320*a* and the intermediate part 322*a* while the second bent part 326 is located between the intermediate part 322*a* and the other-end part 324*a*. The intermediate part 322*a* and the other-end part 324*a* are provided along the resin part 370. With this configuration, the leads that belong to the first lead group 316*a* are in a state of wrapping the resin part 370.

The leads 318*a*, 318*e*, 318*f*, and 318*j*, which belong to the second lead group 316*b*, are formed by folding a conductive flat plate having a one-end part 320*b* and an other-end part 324*b*. Each of the one-end part 320*b* is electrically coupled to one of the connection terminals 44*a*, 44*e*, 44*f*, and 44*j* of the gyro sensor 10 so that a main surface of each of the one-end parts 320*b* and a main surface of each connection terminal 44 face each other. The other end part 324*b* serves as a test-write terminal of the sensor device 100*d*. In the same manner as the leads forming the first lead group 316*a*, each lead belonging to the second lead group 316*b* has an intermediate part 322*b* between the one-end part 320*b* and the other-end part 324*b*. In the sensor device 100*d* according to the embodiment, the one-end part 320*b* side of the intermediate part 322*b* is buried in the resin part 370 while the other-end part 324*b* of the intermediate part 322*b* is exposed from the resin part 370.

Figure 16A:
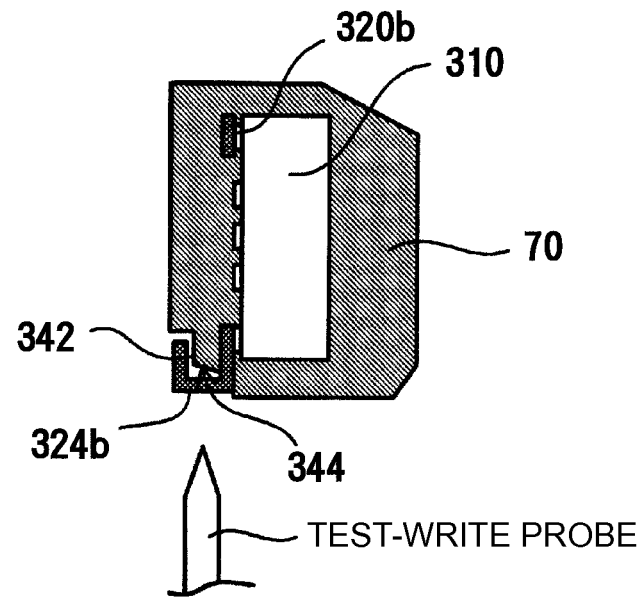
FIG. 16A is a diagram showing a state before a probe is brought into contact with a test-write terminal.
Figure 16B:
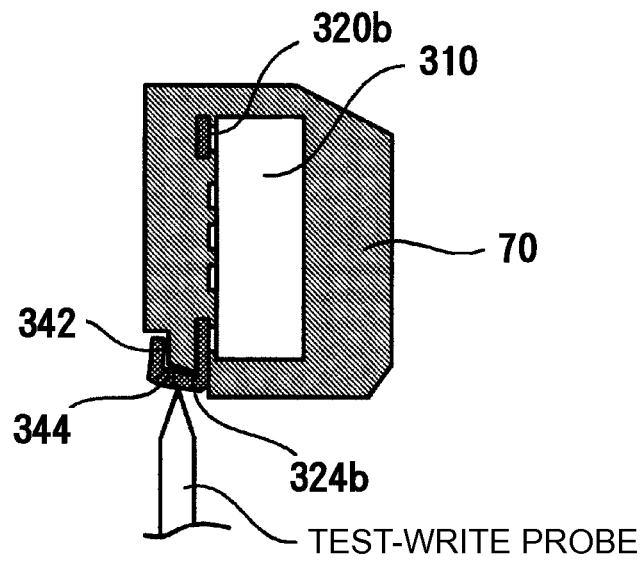
FIG. 16B is a diagram showing a state in which the probe is brought into contact with the test-write terminal.

The second lead group 316*b* is laid out between the connection terminals 44*a* to 44*j* in two rows formed along the pair of sides in the terminal forming surface and extended toward outside the gyro sensor 10 from one of the sides that intersects with the pair of sides in the terminal forming surface while each one-end part 320*b* is coupled to the connection terminals 44*a*, 44*e*, 44*f*, and 44*j*. At this time, each intermediate part 322*b* of the leads 318*b* to 318*d* and 318*g* to 318*i* is formed and provided so as not to be electrically coupled to other leads of the leads 328*b* to 318*d* and 318*g* to 318*i* as well as the connection terminals 44*b* to 44*d* and 44*g* to 44*i*. A first bent part 330 is provided between each intermediate part 322*b* and each other-end part 324*b*. A second bent part 332 for providing the one-end part 320*b* along the resin part 370 is provided to each other-end part 324*b*. Here, the first and second bent parts 330 and 332 may be provided so as to provide a small space (a relief part 344) between the resin part 370 and each other-end part 324*b* of the leads forming the second lead group 316*b*. It is because when other-end part 324*b* is used as a test-write terminal, the other-end part 324*b* bends in the resin part 370 side in accordance with a contact of a test-write probe (refer to FIGS. 16A and 16B: FIG. 16A shows a state before the contact of the probe and FIG. 16B shows a state of being contacted by the probe.

This function prevents the end part of the probe from being worn off. In addition, even if displacement and the like are produced in the test-write terminal by displacement and the like of the bending angle when the terminals are formed, it is possible to insert the test-write probe. As a result, contact failures can be prevented.

The resin part 370 protects the connection surface between the connection terminals 44*a* to 44*j* and the leads 318*a* to 318*j*, and covers the connection surface and the gyro sensor 10. The resin part 370 includes a cutout part 342 for disposing the other-end part 324b of the second lead group 316b. The cutout part 342 is formed so as to be recessed with respect to the outline of the resin part. When the resin part 370 of the sensor device 100d, which is in the mounting state, is viewed from above, the other-end part 324b serving as the test-write terminal is hidden. Thus, each lower end of the other-end part 324b of the leads that belong to the second lead group 316b disposed to the cutout part 342 is located higher than each lower end of the other-end part 324a of the leads that belong to the first lead group 316a disposed to the bottom surface side of the resin part 370.

With this configuration, when the sensor device 100d is mounted on the mounting substrate, the other-end part 324b serving as the test-write terminal is not exposed. As a result, it is possible to reduce the risk of the inadvertent contact of electrodes of other electronic components and the like. Further, a step is produced between the other-end part 324a serving as the mounting terminal and the other-end part 324b serving as the test-write terminal, surely preventing short-circuits therebetween. Since the other-end part 324b is suspended from the mounting surface, forming a patter on the mounting substrate for mounting the other-end part 324b is obviously unnecessary.

In the sensor device 100d, the connection terminals 44a to 44j are electrically coupled and physically fixed to the leads 318a to 318j, respectively, with a conductive adhesive or an adhesive and a metal wire (all not shown). The first and second bent parts 325 and 326 of the leads forming the first lead group 316a and the first and second bent parts 330 and 322 of the leads forming the second lead group 316b are formed after the formation of the resin part 370. The resin part 370 is formed by a molding process using a die.

A specific method for manufacturing the sensor device 100d is as follows. First, the leads 318a to 318j, which belong to the first lead group 316a or the second lead group 316b, are formed. The leads 318a to 318j, which are formed, are physically fixed and electrically coupled to the gyro sensor 10 manufactured in different steps. The gyro sensor 10 to which the leads 318a to 318j are coupled is introduced into the die and covered by a resin so as to form the resin part 370 having a desired shape. Thereafter, the leads 318a to 318j, which form the first lead group 316a or the second lead group 316b, are bent so as to form the first bent parts 325 and 330 as well as the second bent parts 326 and 332.

According to the sensor device 100d having such a configuration, it is possible to form the other-end part 324a serving as a user terminal (the mounting terminal) and the other-end part 324b serving as the test-write terminal at different sides of the bottom surface of the sensor device 100d. As a result, short-circuits between the mounting terminal and the test-write terminal can be prevented.

The leads 318a, 318e, 318f, and 318j, which form the second lead group 316b, are laid out on the terminal forming surface of the gyro sensor 10, improving the mounting stability when the gyro sensor 10 is mounted on the leads 318a to 318j. Such mounting stability contributes to improve the detection accuracy in a sensor device in which a variation of an angle (a mounting angle) is problematic that is formed by a mounting substrate and a mounting surface of an element, such as an angular velocity sensor or an acceleration sensor, built into the gyro sensor 10.

In the above embodiment, each intermediate part 322a of the leads that belong to the first lead group 316a includes the angled part 328. Accordingly, the terminal forming surface of the gyro sensor 10 and the mounting surface of the sensor device 100d can be mounted at different angles with respect to the mounting substrate. Meanwhile, the angle between the terminal forming surface and the mounting surface may be angled by forming the intermediate part 322a in a fan shape in a planer view, i.e., by extending the intermediate part 322a in an arc shape. With this configuration, it is possible to change the angle between the terminal forming surface and the mounting surface by a length of the intermediate part 322a.

What is claimed is:

1. A sensor device, comprising:
   a sensor component including:
      a package;
      connection terminals including first connection terminals on a terminal forming surface of the package;
      a sensor element that has a detection axis and is housed in the package; and
   mounting leads, each of the mounting leads including, including:
      a one-end part coupled to one of the first connection terminals so that a main surface of the one-end part and a main surface of the one of the first connection terminals face each other;
      an intermediate part extending toward a mounting surface of the sensor device from the one-end part; and
      an other-end part;
   wherein the sensor component is tilted or orthogonal with respect to the mounting surface, and the connection terminals are provided along one of sides forming an outline of the terminal forming surface, the one of sides being tilted or orthogonal with respect to the mounting surface.

2. The sensor device according to claim 1, wherein the terminal forming surface of the sensor component is orthogonal to the mounting surface of the sensor device, and the connection terminals are provided along the one of sides of the terminal forming surface, the one of sides being orthogonal to the mounting surface.

3. The sensor device according to claim 1, wherein the intermediate part includes an angled part.

4. The sensor device according to claim 1, wherein a planer shape of the intermediate part is an arch shape.

5. The sensor device according to claim 1, wherein the other-end parts of the mounting leads are bent to a side of one main surface and a side of the other main surface of the mounting lead.

6. The sensor device according to claim 5, wherein the other-end parts of the mounting leads adjacent to each other are alternately bent toward the one main surface and the other main surface of the mounting lead.

* * * * *